United States Patent
Johnson et al.

(10) Patent No.: US 6,435,366 B1
(45) Date of Patent: Aug. 20, 2002

(54) APPLIANCE WASHING TUB HAVING NON-METALLIC REINFORCING BODY AND METALLIC INNER LINER

(75) Inventors: Thomas M. Johnson; Rodney M. Welch, both of Jackson, TN (US)

(73) Assignee: Maytag Corporation, Newwton, IA (US)

( * ) Notice: Subject to any disclaimer, the term of this patent is extended or adjusted under 35 U.S.C. 154(b) by 0 days.

(21) Appl. No.: 09/372,827

(22) Filed: Aug. 12, 1999

(51) Int. Cl.⁷ ................................................ B65D 90/00
(52) U.S. Cl. ................................. 220/62.22; 220/62.11; 220/62.15
(58) Field of Search ........................... 220/62.22, 62.15, 220/62.11

(56) References Cited

U.S. PATENT DOCUMENTS

| | | |
|---|---|---|
| 3,115,885 A | 12/1963 | Jenkins |
| 3,298,559 A * | 1/1967 | Lurie ...................... 220/62.22 |
| 3,638,299 A | 2/1972 | Garner et al. |
| RE27,430 E * | 7/1972 | Wimmer .................. 220/62.22 |
| 4,502,660 A | 3/1985 | Luther et al. |
| 5,189,781 A | 3/1993 | Weiss et al. |
| 5,296,178 A | 3/1994 | Sugihara et al. |

* cited by examiner

*Primary Examiner*—Steven Pollard
(74) *Attorney, Agent, or Firm*—Diederiks & Whitelaw, PLC

(57) ABSTRACT

A washing tub is formed with a reinforcing body made from a non-metallic material, such as plastic or fiberglass, and a thin interior liner portion constituted by a metallic material, preferably stainless steel. The metallic material is preferably sprayed onto a tub shaping member and then the reinforcing body is attached to the metallic material. In accordance with one embodiment of the invention, the reinforcing body is formed from plastic, such as polypropylene, which is injected about a mold core following the spray coating of the metallic material on the core. In another embodiment, the reinforcing material is constituted by fiberglass which is layered about a shaping member having the metallic liner portion deposited thereon. In any case, an aesthetically appealing and extremely cost effective, high quality washing tub is produced.

8 Claims, 2 Drawing Sheets

APPLIANCE WASHING TUB HAVING NON-METALLIC REINFORCING BODY AND METALLIC INNER LINER

BACKGROUND OF THE INVENTION

1. Field of the Invention

The present invention pertains to the art of appliances and, more particularly, to the formation of a washing tub defined by a reinforcing body made from a non-metallic material, such as plastic or fiberglass, and an inner exposed liner formed from a metallic material, such as stainless steel.

2. Discussion of the Prior Art

In appliances which incorporate washing tubs, such as dishwashers and clothes washing machines, it is known to form the tubs in various ways and from numerous different materials. For instance, it is known to make a tub from metal, such as steel, which is coated with a baked-on enamel or porcelain. Such tubs certainly last a long time but can be fairly heavy. A high-end appliance model may incorporate a tub made entirely of stainless steel which does not require any interior coating. In addition to perhaps being a very aesthetically appealing construction, stainless steel tubs may be the most hygienic. Other known tubs are entirely molded of plastic, such as polypropylene. Obviously, forming a tub entirely of plastic is more cost efficient and results in an extremely light weight, yet durable, product.

Unfortunately, there does not exist an appliance tub on the market which is made to exhibit the advantages of many of the known tub constructions. Therefore, there exists a need in the art for an appliance tub, as well as a method of making the same, which is light weight, cost effective and, at the same time, exhibits positive features of a high-end model tub.

SUMMARY OF THE INVENTION

The present invention is directed to forming a high-end washing tub in an extremely cost effective and efficient manner. More specifically, the washing tub of the invention includes a light weight, non-metallic reinforcing body and a metallic inner surface liner. In its most preferred form, the invention is directed to a washing tub, such as a clothes washing or dishwashing tub, preferably formed of a relatively thick plastic or fiberglass outer reinforcing body and a thin inner liner layer of stainless steel. With this construction, the materials of the washing tub synergistically combine such that a washing tub exhibiting beneficial characteristics from each of the materials is produced.

In accordance with a first preferred embodiment of the invention, the washing tub is produced through a molding operation typically used in forming a conventional plastic washing tub except, prior to injecting the plastic material into a suitable mold cavity, a core of the mold is spray coated with stainless steel. The air flow rate associated with the spraying machine can be varied during the overall coating process to initially apply a fine-grained layer onto the core and then to follow with a rough and porous layer. With this arrangement, after the mold cavity is formed and the plastic is injected into the mold cavity, the plastic bonds mechanically with the stainless steel.

In another embodiment of the invention, the washing tub is formed with a stainless steel inner surface and a fiberglass reinforcing body. In accordance with this preferred embodiment, the stainless steel material is spray coated onto a core or mandrel and then fiberglass is laid around the stainless steel to create a reinforcing body for the tub. In forming a dishwasher tub, features such as an air inlet and float standpipes could be readily provided for. For instance, in the fiberglass embodiment, standard air inlet and float standpipes could be molded from plastic or made from stainless steel and inserted through the stainless steel liner and retained in place by the fiberglass. Furthermore, a solid piece of stainless steel could be inserted into the core to create a groove for retaining a door gasket.

Additional objects, features and advantages of the washing tub constructed in accordance with the present invention will become more fully apparent below when taken in conjunction with the drawings wherein like reference numerals refer to corresponding parts in the several views.

DETAILED DESCRIPTION OF THE PREFERRED EMBODIMENT

Figure 1:
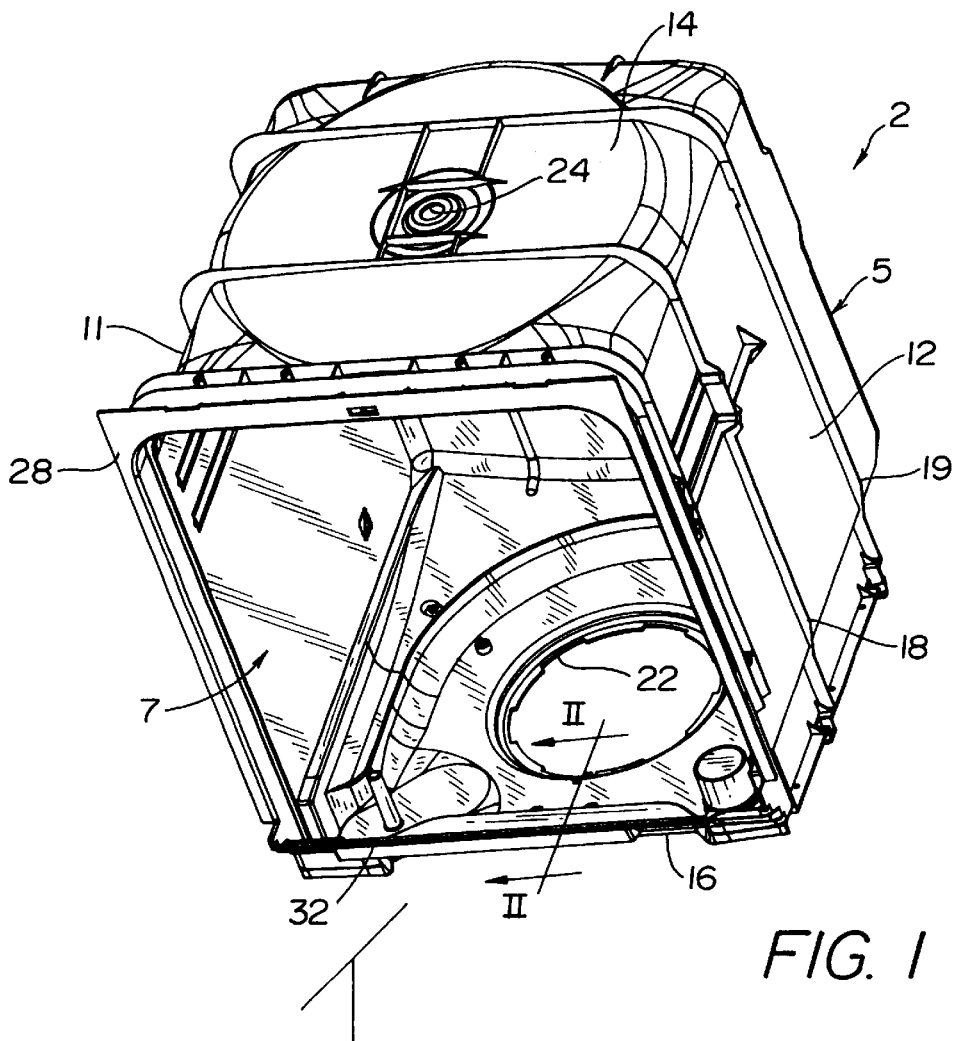
FIG. 1 is a perspective view of a dishwasher tub constructed in accordance with the present invention.

With initial reference to FIG. 1, a tub constructed in accordance with the present invention is generally indicated at 2. In the embodiment shown, tub 2 constitutes a dishwasher tub which is being utilized for exemplary purposes in describing a preferred embodiment of the invention. In any event, at this initial point, it should be realized that the present invention can be employed in producing other types of appliance washing tubs, including a clothes washing tub. In general, dishwasher tub 2 includes an outer body portion 5 and an inner liner portion 7. In the embodiment shown, outer body portion 5 is formed of plastic, such as polypropylene, and inner liner portion 7 is constituted by stainless steel.

More specifically, dishwasher tub 2 includes opposing sides 11 and 12, a top 14 and a bottom 16. In the most preferred form of the invention shown, outer body portion 5 is injection molded and integrally formed with various reinforcing ribs such as those indicated at 18 and 19. Furthermore, dishwasher tub 2 is provided with a substantially central opening 22 formed in bottom 16, as well as an aperture 24 formed in top 14. In general, forming an opening in the bottom portion of a dishwasher tub, as well as an aperture in a top portion of the tub, is widely known in the art, with opening 22 accommodating a motor pump assembly and aperture 22 being utilized to mount a spraying unit. Since these structural aspects of dishwasher tub 2 are not considered part of the present invention, they will not be discussed further here. Outer body portion 5 is also formed with an out-turned flange 28, as well as a lower lip portion 32. This construction is also widely known in the art, particularly with respect to dishwasher tubs mounted under countertops in residential kitchens.

Figure 2:
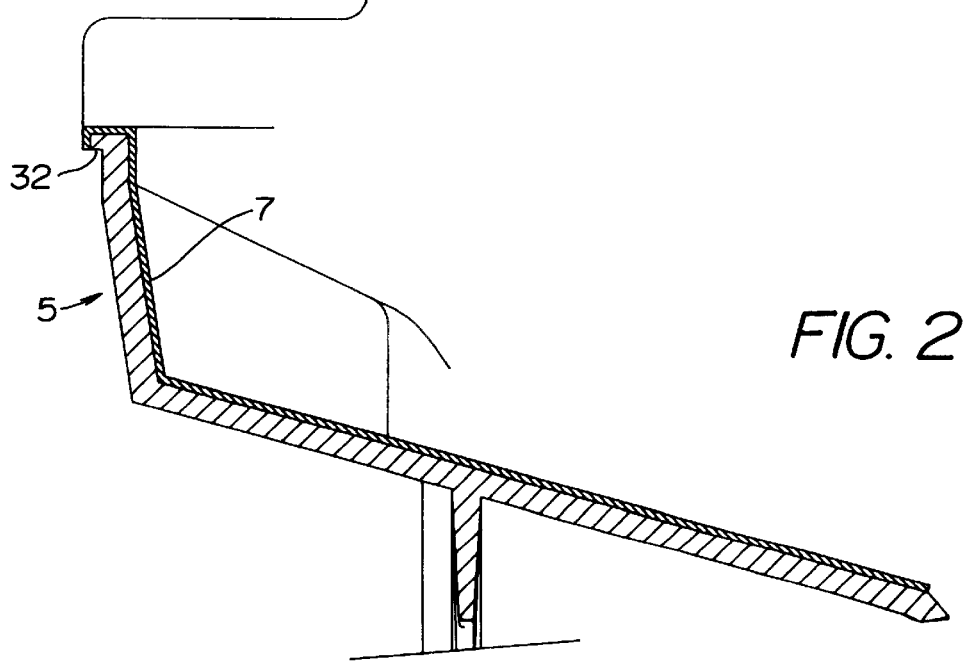
FIG. 2 is a cross-sectional view taken along line 2—2 in FIG. 1.

The present invention is particularly directed to the incorporation of metallic interior liner portion 7 in combination with the non-metallic outer or exterior body portion 5. In accordance with the most preferred form of the invention, the inner stainless steel liner 7 has a thickness generally in the range of 3–5 mils, while the plastic outer body portion 5 has an associated thickness which is multiple times the thickness of the liner portion 7. In the most preferred form of the invention, outer body portion 5 has a thickness in the order of 120–140 mils. With this construction, the necessary amount of the relatively expensive stainless steel liner material is minimized, while body portion 5 has an associated thickness which will reinforce liner portion 7 and ensure proper structural integrity for the overall tub 2. In the most preferred embodiment shown, liner portion 7 is provided along the inside of each of sides 11 and 12, top 14, bottom 16, as well as over at least lip portion 32 (also see FIG. 2). Additionally, the metallic liner portion 7 can be provided about out-turned flange 28 in accordance with the invention. With this construction, dishwasher tub 2 can exhibit aesthetic, hygienic and other advantageous characteristics of a dishwasher tub fully formed of stainless steel, but can be made at a fraction of the cost.

Figure 3:
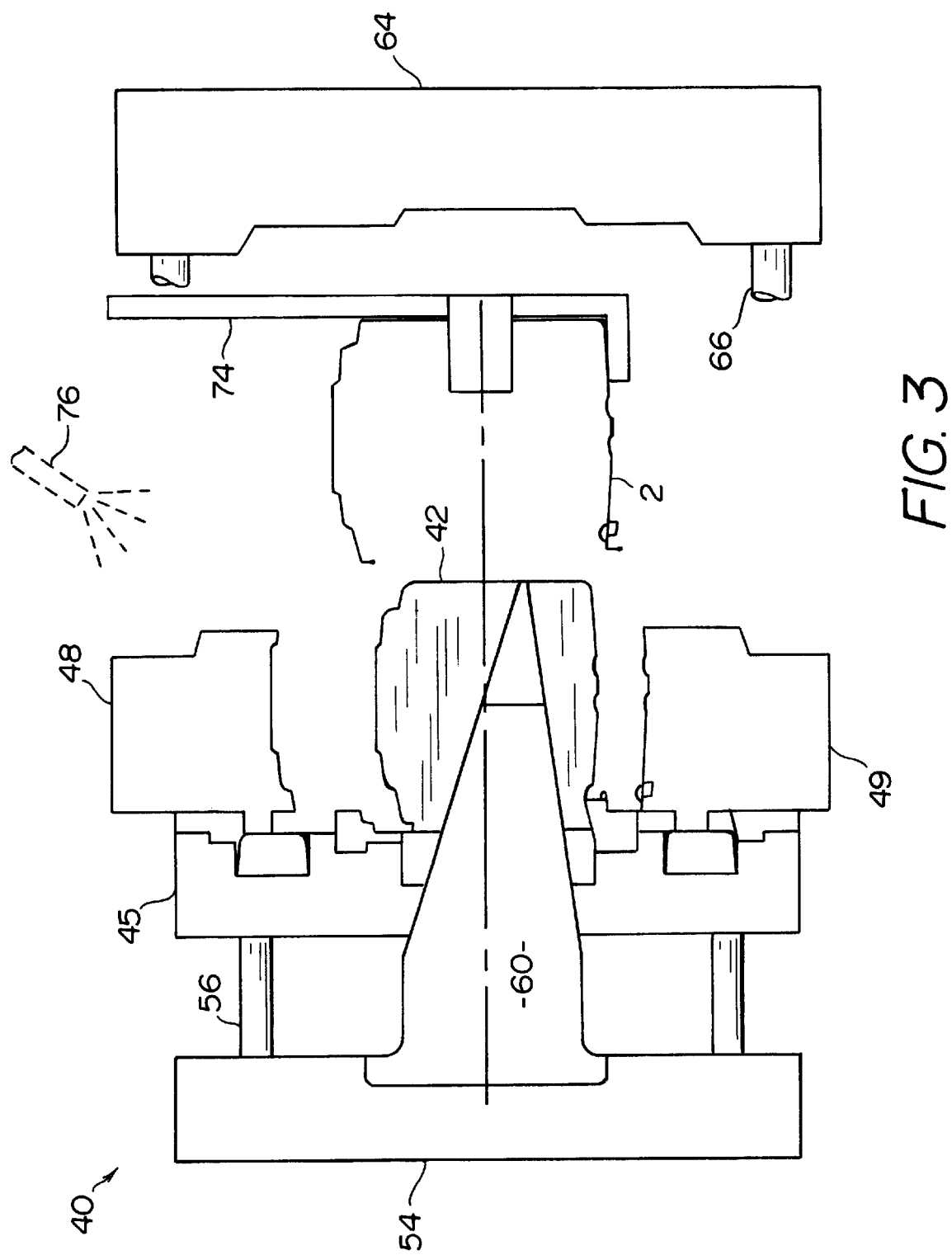
FIG. 3 is a partially exploded view of a molding machine configured to make a tub in accordance with the present invention.

Reference will now be made to FIG. 3 in describing a preferred manner of forming a tub 2 in accordance with the present invention. In general, FIG. 3 represents a partially exploded view of a molding assembly 40 which includes a collapsible mold core 42 that is attached to a support platform 45. Mold assembly 40 also has associated therewith various shiftable side wall members which are spaced circumferentially around mold core 42. FIG. 3 illustrates two such side wall members 48 and 49, even though additional side wall members would typically be provided. Molding assembly 40 also includes a first mold plate 54 which is guided for movement relative to support platform 45 due to the presence of various spaced shafts 56. More specifically, first mold plate 54 can assume an open condition as generally illustrated in FIG. 3 and a closed condition wherein first mold plate 54 is shifted towards support platform 45. The first mold plate 54 carries a core deflecting or wedge member 60 which extends between the various collapsible sections of mold core 42 such that, as wedge member 60 is shifted towards support platform 45 in unison with first mold plate 54, the various collapsible sections of mold core 42 are shifted outwardly in an initial mold preparation step. Molding assembly 40 also includes a second mold plate 64 having associated guide shafts 66. Although not shown due to the exploded view provided, the second mold plate 64 is adapted to mate with shiftable side wall members 48 and 49 such that an internal mold cavity is defined between mold core 42 and each of support platform 45, side wall members 48 and 49 and second mold plate 64. It is into this internal cavity that plastic is injected to produce dishwasher tub 2. Once dishwasher tub 2 is produced, molding assembly 40 is opened as generally indicated in FIG. 3 and a part removing arm 74 is introduced to take dishwasher tub 2 off of mold core 42.

The general construction and operation of molding assembly 40 has been provided here for the sake of completeness. However, this structure and operation is well known in the art and does not form part of the present invention. Instead, the present invention modifies such a known molding assembly 40 by incorporating a metal spraying unit 76. Therefore, in actually forming a dishwasher tub 2 in accordance with the preferred embodiment of the invention, metal spraying unit 76 is initially utilized to coat mold core 42 with stainless steel. Actually, it is first preferable to coat mold core 42 with a releasing agent to enhance the removal of the dishwasher tub 2 therefrom following the complete operation. Utilizing releasing agents in molding operations is also known in the art. Thereafter, metal spraying unit 76 preferably sprays the metallic material at a first rate so as to arrange a fine-grained layer next to mold core 42. Thereafter, the metallic material is sprayed at a high flow rate such that the size of the metal droplets increases to create a very rough and porous layer upon the fine-grained layer. This rough and porous outer finish of liner portion 7 aids in assuring that a strong mechanical bond will be created between the stainless steel and the subsequently injected plastic. In the most preferred form, spraying unit 76 is pneumatic, with the air flow rate being simply varied through appropriate pneumatic controls.

With this operation, the interior surface of dishwasher tub 2 as defined by liner portion 7 will have a fine appearance and low porosity, while liner portion 7 will also have an exterior rough texture for bonding with the injected plastic used to define outer reinforcement body portion 5. Although this preferred embodiment utilizes plastic to create the outer body portion 5, it is also contemplated in accordance with the present invention to utilize other materials. For instance, the invention encompasses layering the stainless steel liner portion 7 with a reinforcing body portion 5 formed of other materials such as fiberglass. That is, liner portion 7 is created upon mold core 42 or a mandrel and then fiberglass is layered thereon. Furthermore, it is possible to initially produce the plastic outer body portion 5, remove the outer body portion from mold core 42 and then coat the liner portion 7 thereon. In accordance with this embodiment, the surface of the plastic would be heated to about 200° F. In the most preferred form of this embodiment, a two-stage coating process is utilized wherein a first metal, such as zinc, is initially sprayed onto the plastic. Thereafter, the stainless steel is sprayed onto the zinc.

Regardless of the particular manner in which the washing tub 2 of the present invention is formed, washing tub 2 will have an interior liner portion 7 formed from a relatively thin metallic material which is attached to an exterior tub portion 5 formed from a non-metallic material. With this arrangement, the exterior tub portion 5 will define a reinforcing body for the washing tub 2, while the metallic liner portion 7 will define an inner exposed surface.

Although described with respect to preferred embodiments of the invention, it should be readily understood that various changes and/or modifications can be made to the invention without departing from the spirit thereof. For instance, in the fiberglass embodiment, standard air inlet and float standpipes could be molded from plastic or made from stainless steel and inserted through the stainless steel liner and retained in place by the fiberglass. Furthermore, a solid piece of stainless steel could be inserted into the core to create a groove for retaining a door gasket. In general, the invention is only intended to be limited by the scope of the following claims.

We claim:

1. An appliance washing tub comprising: an interior liner portion formed from a metallic material attached to an exterior tub portion formed from a non-metallic material, said non-metallic exterior tub portion having an associated thickness which is multiple times a thickness of the metallic interior liner portion such that the non-metallic exterior tub portion defines a reinforcing body of the appliance washing tub and the metallic interior liner portion defines an exposed inner surface of the appliance washing tub.

2. The appliance washing tub according to claim 1, wherein the metallic interior liner portion is constituted by stainless steel.

3. The appliance washing tub according to claim 2, wherein the exterior tub portion is formed of plastic.

4. The appliance washing tub according to claim 3, wherein the plastic constitutes polypropylene.

5. The appliance washing tub according to claim 2, wherein the exterior tub portion is formed of fiberglass.

6. The appliance washing tub according to claim 1, wherein the interior liner portion has a thickness in the range of 3–5 mils.

7. The appliance washing tub according to claim 6, wherein the exterior tub portion has an associated thickness which is at least twenty times the thickness of the interior liner portion.

8. The appliance washing tub according to claim 1, wherein the appliance washing tub defines a dishwasher tub.

* * * * *